United States Patent [19]

Wheeler

[11] Patent Number: 4,718,170

[45] Date of Patent: Jan. 12, 1988

[54] APPARATUS AND MEANS FOR VERTICALLY ALIGNING A HOLLOW CYLINDER

[75] Inventor: Wallace T. Wheeler, Dallas, Tex.

[73] Assignee: The Texacone Company, Mesquite, Tex.

[21] Appl. No.: 908,645

[22] Filed: Sep. 18, 1986

[51] Int. Cl.$^4$ .............................................. G01B 15/02
[52] U.S. Cl. .................................... 33/228; 33/1 H; 33/286; 33/309; 33/348; 33/391
[58] Field of Search ................. 33/286, 309, 308, 302, 33/348, 333, 391, 370, 371, 1 H, 228

[56] References Cited

U.S. PATENT DOCUMENTS

| | | |
|---|---|---|
| 928,477 | 7/1909 | Sloggett . |
| 1,340,995 | 5/1920 | Werner . |
| 1,745,027 | 1/1930 | Oxford . |
| 1,820,082 | 8/1931 | McLain ................. 33/309 |
| 1,837,479 | 12/1931 | Pew, Jr. et al. ............. 33/309 |
| 2,665,498 | 1/1954 | Mitchell . |
| 2,792,637 | 5/1957 | Seigel . |
| 2,959,088 | 11/1960 | Rantsch . |
| 3,151,402 | 10/1964 | Gelgessen . |
| 3,279,085 | 10/1966 | Reinhart . |
| 3,475,101 | 10/1969 | Jeffery, Sr. . |
| 3,715,808 | 2/1973 | Petrik . |
| 3,920,335 | 11/1975 | Seehase . |
| 4,053,239 | 10/1977 | Tolmon . |
| 4,155,172 | 5/1979 | Bartol . |
| 4,206,550 | 6/1980 | Boyett et al. ............. 33/286 |
| 4,272,191 | 6/1981 | Bergkvist . |
| 4,517,749 | 5/1985 | Scotto . |

Primary Examiner—William D. Martin, Jr.
Attorney, Agent, or Firm—Michael A. O'Neil

[57] ABSTRACT

A vertical alignment apparatus has a light and a light fixture attached to a cable to be lowered into the cylinder to be aligned. A disk mounted on top of the light fixture and centered about the light fixture and the cable causes the light emitted from the light fixture to form a halo between the disk and the wall of the cylinder. A tripod on top of the cylinder movingly centers the light, light fixture and disk in the cylinder. The method of the invention involves lowering the apparatus into the cylinder. The light fixture is activated to create a halo of light around the disk. The light fixture is then raised up the casing, and the casing is adjusted until the halo has circular consistency.

7 Claims, 4 Drawing Figures

APPARATUS AND MEANS FOR VERTICALLY ALIGNING A HOLLOW CYLINDER

TECHNICAL FIELD

This invention relates to a vertical alignment apparatus and specifically to apparatus for vertically aligning the hydraulic cylinder casing of an hydraulic elevator.

BACKGROUND OF THE INVENTION

In construction projects there are many instances in which a shaft must be aligned to a truely vertical orientation. For instance, to install an hydraulic elevator, the casing for the hydraulic cylinder must be placed in perfect vertical alignment with the elevator shaft. Failure to do so will result in the hydraulic piston wearing unevenly against the seals at the top of the casing. If the casing is in very poor vertical alignment, the bottom of the piston may scrape against the inside wall of the hydraulic cylinder.

Previously, several methods of aligning the hydraulic cylinder have been developed. However, the prior art methods often require two or three person teams devoting three or four hours to effect alignment of the casing. The alignment procedure typically requires complex mechanisms and involves difficult procedures, so that aligning the casing can become a very expensive task. Notwithstanding such effort and expense, the desired degree of alignment has not been achieved in many cases.

SUMMARY OF THE INVENTION

In accordance with the present invention, a vertical alignment apparatus is disclosed which eliminates these and other problems of the prior art. A centering apparatus placed at the top of the casing has a passageway therethrough to permit an electrical lead to pass downwardly through the exact center of the casing. The electrical lead attaches to a light fixture. A disk having a diameter of approximately $\frac{1}{4}''$ less than the diameter of the casing is mounted on top of the light fixture. The fixture is lowered to the bottom of the casing and a light in the fixture is activated. The fixture is then pulled up the casing and the halo about the disk is observed from above. If the halo is less than perfectly annular, an individual worker can adjust the vertical positioning of the cylinder with a minimum effort.

BRIEF DESCRIPTION OF THE DRAWINGS

A more complete understanding of the invention may be had by reference to the following Detailed Description when taken in conjunction with the accompanying Drawings wherein.

DETAILED DESCRIPTION

Figure 1:
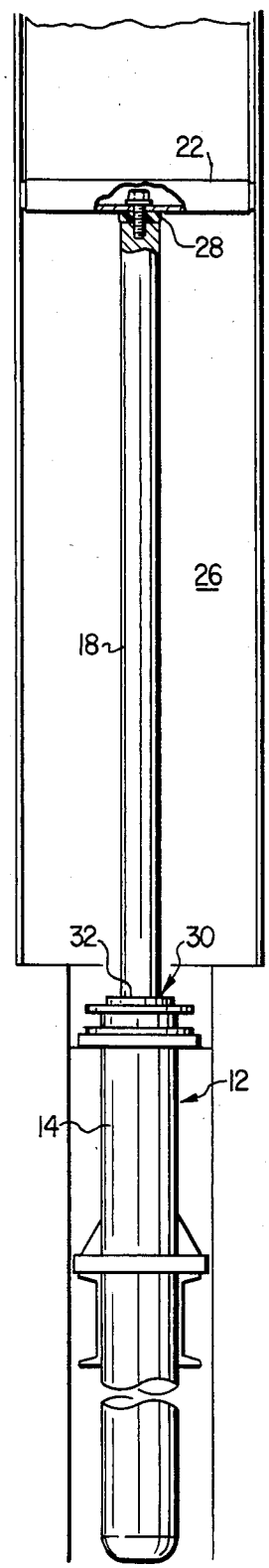
FIG. 1 is a side view of an hydraulic cylinder attached to an elevator in an elevator shaft.

Referring now to the drawings and particularly to FIG. 1 thereof, there is shown an hydraulic elevator 10 as is known in the art comprising an hydraulic cylinder 12 having a casing 14 and a piston 18 as its component parts. The piston 18 is connected to the bottom of an elevator car 22 in an elevator shaft 26 using a wobble plate 28 as is more fully explained in U.S. Pat. No. 4,225,014. An hydraulic cylinder seal 30 on the top of the casing 14 around the piston 18 maintains the hydraulic fluid pressure and prevents dirt from entering the casing 14. The seal 30 may be any of those known in the art such as those more fully explained in U.S. Pat. Nos. 4,526,385 and 4,336,946.

In operation, when the fluid pressure beneath the piston 18 is increased, the piston 18 is pushed upwardly in the casing and the car 22 is raised. To lower the car 22 the fluid pressure is decreased and the piston 18 falls. If the casing 14 is not perfectly vertically aligned, the stress and tension of the piston 18 against the hydraulic cylinder seal 30 will eventually destroy the seal 30. This reduces the longevity of the hydraulic cylinder 12 and increases the risk of dirt and other debris falling down the elevator shaft and into the hydraulic cylinder 12. Furthermore, when the casing is significantly misaligned, the bottom corner of the piston 18 may scrape against the inside wall of the casing 14, causing destruction of the piston 18 and the casing 14.

Figure 2:
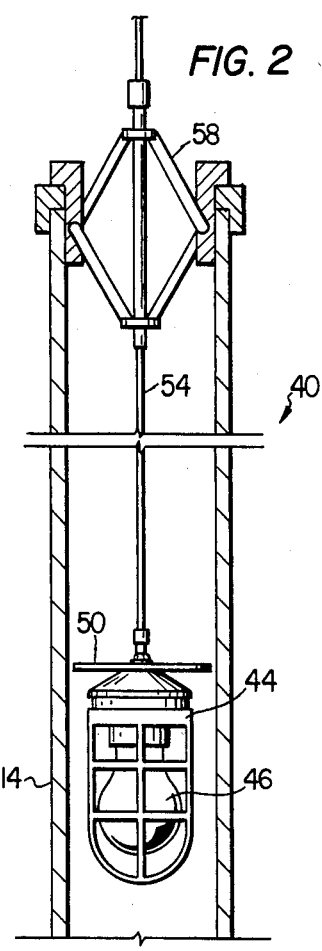
FIG. 2 is a side view of the vertical alignment apparatus of the present invention.

Referring now to FIG. 2, there is shown a vertical alignment apparatus 40 according to the present invention shown inside a casing 14. The vertical alignment apparatus 40 comprises a light fixture 44 containing a light 46. A disk 50 mounted on top of the fixture 44 has a diameter of approximately $\frac{1}{4}''$ less than the inner diameter of the casing 14. A straight power cable 54 is connected to the light fixture 44 above the disk 50 and extends upward through a centering tripod 58 to exit at the top of the casing 14.

The light fixture 44 and light 46 may be any of those known in the art. The disk 50 is a flat, opaque, circular disk having a diameter of $\frac{1}{4}''$ less than the inside diameter of the casing 14. The power cable 54 comprises a straight cord or pipe to maintain the light fixture 44 in its centered position. The centering tripod 58 may be any of those devices known in the art for locating a cable or pipe in the center of a cylindrical casing.

Figure 3A:
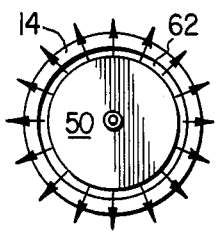
FIGS. 3A and 3B are illustrations of the practice of the invention.
Figure 3B:
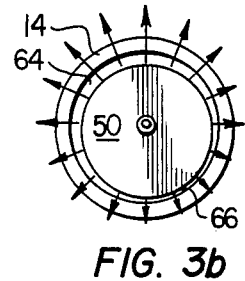

Referring now to FIGS. 3A and 3B, to operate the vertical alignment apparatus 40, the tripod 58 is used to center the cable 54 and the light fixture 44 in the casing 14. The light fixture 44 is then lowered to the bottom of the casing 14. With the light 46 turned on, the fixture 44 and disk 50 are pulled up through the casing 14. If the casing 14 is vertically aligned, as shown in FIG. 3A, a consistent, circular halo of light 62 is emitted from between the inner wall of the casing 14 and the disk 50. However, as shown in the FIG. 3B, if the casing is not vertically aligned, the halo is not circularly consistent but has a bright side 64 and a darker side 66. The worker then adjusts the casing 14 until the halo is consistent and continues to pull the fixture 44 up the casing 14. In this fashion, a single worker may quickly and accurately vertically align the hydraulic cylinder casing 14.

Although a preferred embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

What is claimed is:

1. A vertical alignment apparatus for a hollow cylinder comprising:
   means for providing light;

a circular disk centrally mounted above the means for providing light;

means for movingly supporting the light means and the disk in an elevated position; and means for centering the means for providing light and the disk inside the cylinder.

2. The apparatus of claim 1 wherein the means for support comprises a straight cable and a means for supplying power to the light means.

3. The apparatus of claim 1 wherein the centering means comprises an adjustable tripod.

4. A vertical alignment apparatus for a hollow cylinder comprising:

a light fixture;

means for providing light centrally mounted on the bottom of the light fixture;

a circular disk centrally mounted on top of the light fixture;

means for supplying power to the light fixture and for movingly supporting the light fixture and the disk in an elevated position; and means for centering the light fixture and the disk inside a cylinder.

5. The apparatus of claim 4 wherein the means for support comprises a straight cable and a means for supplying power to the means for providing light.

6. The apparatus of claim 4 wherein the centering means comprises an adjustable tripod.

7. A method of vertically aligning a casing comprising the steps of:

providing a vertical alignment apparatus having a vertical alignment apparatus comprising means for providing light, a circular disk centrally mounted on top of the light, means for supporting the light means and the disk in an elevated position and means for centering the light and the disk inside a cylinder;

lowering the light means into the casing;

activating the light means to create a halo of light around the disk;

raising the light means up the casing with the light means activated;

observing the halo of light around the disk; and adjusting the casing so that a halo having circular consistency extends around the disk while raising the light fixture up through the casing.

* * * * *